(12) United States Patent
Mans

(10) Patent No.: US 6,481,777 B2
(45) Date of Patent: Nov. 19, 2002

(54) TETHERING APPARATUS FOR A PEDESTAL MOUNTED VEHICLE SEAT

(75) Inventor: Garry J. Mans, Carrollton, TX (US)

(73) Assignee: Paccar Inc, Bellevue, WA (US)

( * ) Notice: Subject to any disclaimer, the term of this patent is extended or adjusted under 35 U.S.C. 154(b) by 0 days.

(21) Appl. No.: 09/812,002

(22) Filed: Mar. 19, 2001

(65) Prior Publication Data

US 2002/0130528 A1 Sep. 19, 2002

(51) Int. Cl.⁷ ............................. B60N 2/02; B60N 21/00
(52) U.S. Cl. ................ 296/68.1; 296/65.01; 297/216.1; 297/344.2
(58) Field of Search ........................... 296/68.1, 190.01, 296/190.03, 65.01, 65.02, 65.18; 297/216.17, 468, 216.1, 344.2; 180/282

(56) References Cited

U.S. PATENT DOCUMENTS

| | | | | |
|---|---|---|---|---|
| 5,451,094 A | * | 9/1995 | Templin et al. | 297/216.17 |
| 5,642,916 A | * | 7/1997 | Dybro et al. | 297/216.18 |
| 5,810,125 A | * | 9/1998 | Gezari | 296/65.01 |
| 6,120,082 A | * | 9/2000 | Vandermolen | 296/68.1 |
| 6,193,297 B1 | * | 2/2001 | Vandermolen | 296/68.1 |
| 6,322,140 B1 | * | 11/2001 | Jessup et al. | 297/216.17 |

\* cited by examiner

*Primary Examiner*—D. Glenn Dayoan
*Assistant Examiner*—Greg Blankenship
(74) *Attorney, Agent, or Firm*—Sidley Austin Brown & Wood LLP

(57) ABSTRACT

A tethering system for a vehicle seat movable in at least a vertical direction. The system includes a sensor mechanism to detect the occurrence of a prescribed vehicle event. Upon detecting such an event, the tethering system acts to limit the vertical movement of the vehicle seat and/or draw the vehicle seat toward the surface on which the seat is mounted. The prescribed vehicle event can include a vehicle rollover, a vehicle collision, or an excessive vehicle acceleration.

23 Claims, 9 Drawing Sheets

US 6,481,777 B2

TETHERING APPARATUS FOR A PEDESTAL MOUNTED VEHICLE SEAT

TECHNICAL FIELD OF THE INVENTION

The present invention relates generally to occupant restraint devices for vehicles. In one aspect, it relates to an apparatus for tethering a vehicle seat, which is mounted on a suspension pedestal, against unwanted movement relative to the vehicle floor.

BACKGROUND OF THE INVENTION

It is well known to mount a vehicle seat on a pedestal rather than securing it directly to the floor of the vehicle. Seat mounting pedestals may include mechanisms for adjustment of the static fore-aft position of the seat, and may also include mechanisms for adjustment of the static seat height. More sophisticated seat mounting pedestals are also known which include vertical and/or fore-aft suspension devices, for example springs, pneumatic cylinders, or air bags, which allow controlled movement (also known as "travel") of the seat with respect to the vehicle floor during operation of the vehicle. This seat travel tends to isolate the seat (and thus the occupant) from vibration and bouncing.

Most vehicles are now required to provide an occupant restraint system to reduce the likelihood of occupant injury during high acceleration events such as vehicle collisions or rollovers. According to Federal Motor Vehicle Safety Standard (FMVSS) testing, occupant injury is reduced when the forward and upward movement of the occupant is limited as much as possible. The limitation of the occupant's overall movement is best accomplished by restraining the occupant against movement relative to the seat while simultaneously restraining the seat itself against forward and/or upward movement relative to the vehicle floor. Thus, the seat mounting system of a vehicle is often a component of the occupant restraint system.

In some applications, for example in the field of commercial vehicles and long-haul trucks, a wide variety of seats and suspension pedestals are produced by numerous manufacturers. Seats and pedestals are typically manufactured separately, rather than as a unit, so that a vehicle's owner can select individual component according to his or her preferences. The selected components are then installed in the vehicle by the builder. The builder must ensure that the selected components are compatible in terms of both seat suspension operation and occupant restraint operation.

To accommodate the wide variety of seat/pedestal configurations, it has become conventional practice for the occupant restraint system used in trucks having pedestal mounted seats to comprise two principle components, namely, a seat belt apparatus and a seat tethering apparatus. The first component of the restraint system, the seat belt apparatus, ensures that the occupant remains positioned in the seat during a high acceleration event. The seat belt apparatus typically comprises conventional seat belt webbing and a latch mechanism, and may further comprise a shoulder belt and/or belt tensioning mechanisms, all of which are conventional and known in the art for restraining an occupant in a seat. Note, however, that the seat belt webbing and latch are not anchored to the floor of the vehicle, but rather are attached to a structural member, known in the industry as the interconnect point (hereafter "ICP"), which is located on the lower rear portion of the seat or on the upper rear portion of the pedestal.

The second component of the occupant restraint system, the seat tethering apparatus, must restrain the seat against forward or upward movement relative to the floor of the vehicle during high acceleration events, a requirement which cannot generally be satisfied by the seat mounting pedestal alone. One commonly known seat tethering apparatus includes a pair of tether straps, each of which has one end connected to the ICP and another end connected to an anchor point located on the vehicle floor behind the seat. The tether straps are made of webbing material such as that used for seat belts. The tether straps may include mechanisms (one on each strap) to allow manual adjustment in length to accommodate vehicle-to-vehicle differences in the ICP-to-anchor distance and to accommodate adjustments in the static position of the seat relative to the vehicle floor. Proper use of the seat tethering apparatus requires the operator to manually adjust the length of each tether strap so that they are taut between the floor of the vehicle and the ICP on the base of the seat. In this manner, the forward and upward movement of the vehicle seat, and thus of an occupant properly belted into the seat, can be substantially limited relative to the floor of the vehicle during a collision. As a result, the occupant is less likely to incur substantial injuries by using the restraint system.

The conventional practice of using manually adjustable tether straps, however, does not necessarily ensure that the occupant will be optimally retrained in the event of a collision. Optimal restraint requires the length of each seat tether to be adjusted such that substantially all slack in the straps is eliminated. Ideally, the length of each tether strap would be adjusted to eliminate all slack each time the seat position is changed. Given human nature, however, many operators often fail to adjust the tether straps to eliminate the slack after each change in seat position, and further, some operators purposely adjust the tether straps with extra slack so that a full range of seat adjustment is possible at all times. Further, when the pedestal incorporates a suspension system, some slack must be intentionally left in the tether straps to accommodate the desirable movement of the seat through its range of suspension "travel" due to the weight of the occupant and due to dynamic forces (e.g., bouncing) during normal operation of the vehicle. As a result of these factors, there typically will be some slack in conventional seat tethers during normal vehicle operation. This slack represents additional movement through which the occupant will travel during a collision before being restrained by the restraint system, and consequently an increased chance of injury. Therefore, a need exists for a seat tethering apparatus that automatically minimizes the slack in the seat tethers during normal vehicle operation, but without hindering the seat suspension functions and without being dependent on an operator's diligence to tighten the tether straps.

Another concern regarding pedestal mounted vehicle seats relates to accidents in which a vehicle undergoes a rollover event. In such cases, the roof of the vehicle may be crushed inwards, thereby reducing the distance between the floor and the roof. Even though a conventional seat tethering apparatus can prevent the seat and occupant from moving toward the roof, it does nothing to protect the occupant from striking/being struck by the vehicle roof as it moves toward the floor. Therefore, a need exists for a seat tethering apparatus that increases the distance between the occupant's head and the roof of the vehicle during a rollover event to reduce the chance of injury.

SUMMARY OF THE INVENTION

Many of the needs outlined above are addressed by the present invention hereof. It is an object of the present invention to provide a seat tethering apparatus that automatically minimizes the slack in the seat tethers during normal vehicle operation, but without hindering the seat suspension functions and without being dependent on an operator's diligence to tighten the tether straps.

It is another object of the present invention to provide a seat tethering apparatus that increases the distance between the occupant's head and the roof of the vehicle during a rollover event to reduce the chance of injury.

An apparatus for tethering a vehicle seat is provided that can be used for many vehicle applications, but which is particularly suited for use in the cabs of trucks, vans, and other large vehicles. The apparatus includes a webbing member, a sensing mechanism, and a retractor, wherein the retractor includes a spool assembly, a locking mechanism, and a biasing mechanism. The webbing member has one end attachable to a vehicle floor and a second end wound around the spool assembly of the retractor, wherein the retractor is attachable to a vehicle seat. The sensing mechanism senses at least two characteristics: a retractor operation characteristic and a vehicle collision characteristic. The sensing mechanism further produces a signal indicating which characteristic is currently being sensed. The locking mechanism of the retractor operates in response to the signal produced by the sensing mechanism. Specifically, the locking mechanism remains unlocked in response to the retractor operation characteristic and locks in response to the vehicle collision characteristic. The biasing mechanism of the retractor applies a constant force that urges the spool assembly in a direction that winds more of the webbing member toward the retractor. Accordingly, when the retractor operation characteristic is sensed, then the webbing member can be withdrawn from or retracted into the retractor depending on whether the tension applied to the webbing member is more or less than that applied by the biasing mechanism. Alternatively, when the vehicle collision characteristic is sensed, then the webbing member can be retracted further into the retractor if the tension applied is less than that applied by the biasing mechanism. The locking mechanism prevents the webbing member from being withdrawn further from the retractor.

In another embodiment, the webbing member includes an intermediate portion that passes through a corresponding guide portion, or webbing loop, attachable to a vehicle seat. In yet another embodiment, a retractor driving mechanism is included which applies a specified force to the webbing member in response to the vehicle collision signal produced by the sensing mechanism, thereby further retracting the webbing member into the retractor during a collision. In additional embodiments, various known types of drive sources can be used for the retractor driving mechanism, including a gas generator and a piston, a pneumatic piston, an air motor, an electric motor, and the like. In still further additional embodiments, various known types of sensors can be used for the sensing mechanism, including a centrifugal sensor, a pendulum sensor, an inertia sensor, a multi-axis sensor, an impact sensor, an electronic sensor, an accelerometer sensor, and the like.

In another embodiment, the apparatus for tethering a vehicle seat can include two or more webbing members, each of which is wound around the spool assembly of the retractor. In this embodiment, each of the webbing members includes an intermediate portion that passes through a corresponding guide portion, or webbing loop, attachable to a vehicle seat.

In another embodiment, the retractor can be attachable to an interior portion of a vehicle, and the webbing member can have a first end attachable to a vehicle seat and a second end wound around the spool assembly of the retractor.

In another embodiment, an apparatus is provided for effecting the method of retracting a vehicle seat when a vehicle is rolling over, including a vehicle seat, a sensor, and a retractor mechanism. In this embodiment, the sensor can at least sense whether a vehicle rollover is occurring and produce a signal when such a rollover begins. The retractor mechanism operates in response to this vehicle rollover signal and actively retracts the vehicle seat toward a floor of the vehicle. A further embodiment includes a vehicle seat, a retractor, a webbing member, a sensor mechanism, and a retractor driving mechanism. The retractor is attached to the base of the vehicle seat and includes a spool assembly. This embodiment also includes a webbing member with a first end attachable to the vehicle and a second end wound around the spool assembly of the retractor. The retractor driving mechanism causes the spool assembly to rotate in a direction that draws more of the webbing member into the retractor when a vehicle rollover signal is received from the sensor mechanism.

BRIEF DESCRIPTION OF THE DRAWINGS

A better and more complete understanding of the present invention and the advantages thereof will be gained from the following detailed description, claims, and accompanying drawings in which:

DETAILED DESCRIPTION OF THE INVENTION

Figure 1:
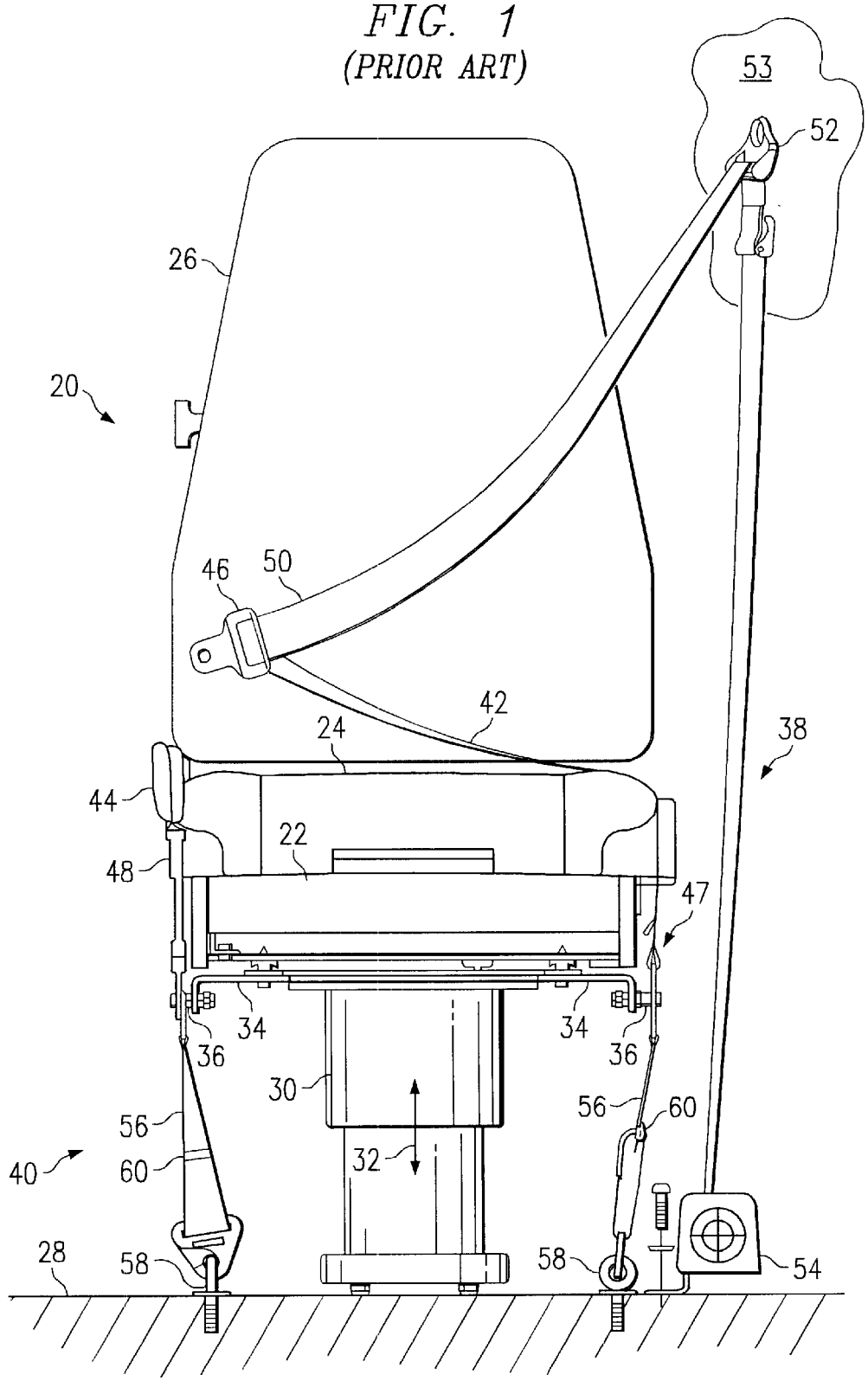
FIG. 1 is a front view of a conventional pedestal mounted vehicle seat having a tethering apparatus.

With reference to the accompanying figures, wherein like reference numerals designate like or corresponding parts throughout the several views, the present invention is explained hereafter.

Referring first to FIG. 1, shown is a pedestal mounted vehicle seat 20 having a tethering apparatus according to the conventional art. The vehicle seat 20 includes a seat frame 22 having attached thereto a seat cushion 24 and a seat back 26 for supporting an occupant (not shown). The vehicle seat 20 can be of conventional construction as is known in the art.

The seat 20 is mounted to a vehicle floor 28 by a pedestal 30 connected between the floor 28 and seat frame 22. The mounting pedestal 30 can be of conventional construction as is known in the art, and can include known mechanisms (not shown) for static adjustment of seat height and fore/aft position. Further, the seat 20 can include known mechanisms allowing up/down suspension travel (indicated by arrow 32) and/or fore/aft suspension travel during normal operation. For purposes of this detailed description, all seat positions and movements are described relative to the vehicle floor 28, unless expressly stated otherwise. An ICP (interconnect point) bracket 34 is rigidly attached to the upper portion of the pedestal 30, and an ICP 36 is rigidly attached at each end of the ICP bracket 34, providing a connection point for the occupant restraint system components as described below.

The vehicle seat 20 according to the prior art further includes an occupant restraint system including a seat belt apparatus 38 and a seat tether apparatus 40. The seat belt apparatus 38 includes seat belt webbing 42 and a buckle mechanism with latch 44 and latch plate 46. The seat belt webbing 42 extends from the latch plate 46 and is connected to one of the ICPs 36 (at the point indicated by arrow 47). The latch 44 is connected to the other ICP 36 by a connecting member 48. The seat belt apparatus 38 shown in FIG. 1 also includes a shoulder belt portion 50 which extends from the latch plate 46, through a turning loop 52 mounted on the vehicle wall 53 to a tensioning/locking mechanism 54 mounted on the vehicle floor 28. It will be readily apparent that when an occupant of the seat 20 properly positions the seat belt apparatus 38 around his or her body and buckles the latch plate 46 into the latch 44, the seat belt webbing 42, latch 44, 46 and connecting member 48 will transmit any forward or upward forces on the occupant's body to the ICPs 36. Because the seat belt apparatus 38 is of conventional construction and function, it will not be further described.

The second component of the occupant restraint system, the seat tethering apparatus 40, must restrain the seat 20 against forward or upward movement relative to the floor 28 of the vehicle during high acceleration events, a requirement which cannot generally be satisfied by the seat mounting pedestal 30 alone. The commonly known seat tethering apparatus 40 shown in FIG. 1 includes a pair of tether straps 56, each of which has one end connected to the ICP 36 and another end connected to an anchor point 58 located on the vehicle floor 28 behind the seat. The tether straps 56 are made of webbing material such as that used for seat belts. The tether straps 56 may include mechanisms 60 (one on each strap) to allow manual adjustment in length to accommodate vehicle-to-vehicle differences in the ICP-to-anchor distance and to accommodate adjustments in the static position of the seat 20 relative to the vehicle floor 28. Proper use of the tethering apparatus 40 requires the operator to manually adjust the length of each tether strap 56 so that they are taut between the floor 28 of the vehicle and the ICP 36 of the seat 20. In this manner, the forward and upward movement of the vehicle seat 20, and thus of an occupant properly belted into the seat, can be substantially limited relative to the floor 28 of the vehicle during a collision.

Figure 2:
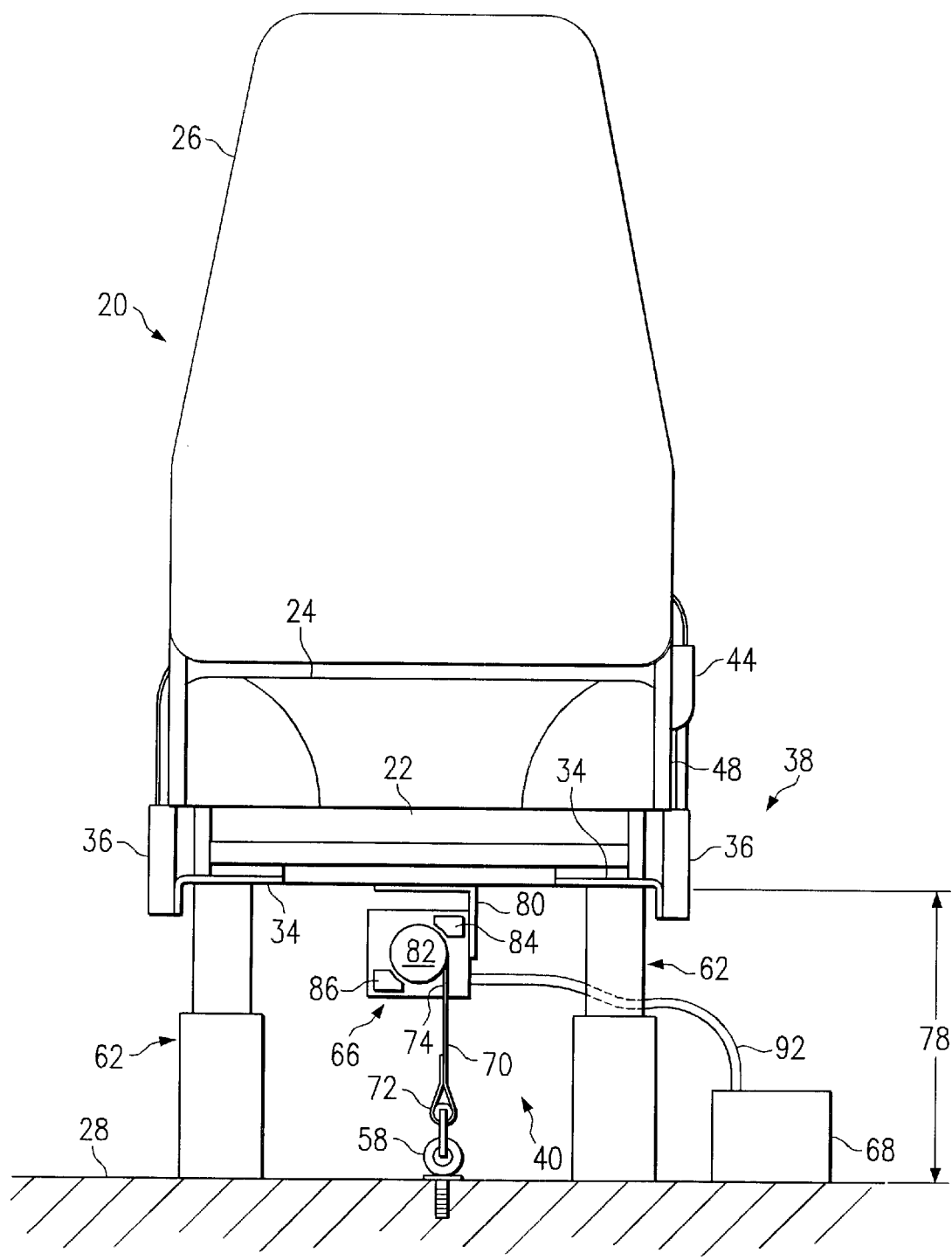
FIG. 2 is a front view of a pedestal mounted vehicle seat having a tethering apparatus according to a first embodiment of the present invention.

A first embodiment according to the present invention is shown in FIG. 2. The ICP bracket 34 provides an ICP 36 on the left and right sides of the seat 20. A seat belt apparatus 38 is secured to the seat 20 at the right ICP 36 so as to limit the movement of an occupant secured to the seat 20 with the seat belt apparatus 38 relative to the seat 20. Two adjustable suspension mechanisms 62 are attached to the seat frame 22. The adjustable suspension mechanisms 62 allow movement of the seat 20 relative to the floor 28 in a vertical direction and a fore/aft direction such that the position of the seat 20 can be adjusted as desired.

The seat tethering apparatus 40 includes a retractor 66, a sensing mechanism 68, and a webbing member 70 that has a first end 72 attached to the floor 28 and a second end 74 attached to the retractor 66. In the first embodiment shown in FIG. 2, an anchor 76 is rigidly attached to the floor 28, and the first end 72 of the webbing member 70 is securely attached to the floor 28. However, the first end 72 of the webbing member 70 can be secured to the floor 28 in any manner that securely retains the first end 72. The free length 78 a variable distance measured between the floor 28 and the frame 22, varies in accordance with the operation of the seat tethering apparatus 40.

In the first embodiment, the retractor 66 is attachable to the frame 22 of the seat 20. A support bracket 80 is rigidly attached to the frame 22 of the seat 20, and the retractor 66 is rigidly attached to the support bracket 80. However, other alternatives can be used for attaching the retractor 66 to the seat frame 22, such as bolts, clamps, enclosures incorporated into the seat frame 22 that enclose and retain the retractor 66, or any other method or device for maintaining the position of the retractor 66 relative to the frame 22 of the seat 20.

In the first embodiment of the present invention, the retractor 66 is of a type generally known and used in the art of retractable vehicle seat belts. The use of known retractors of this type will substantially decrease the cost of the seat tethering apparatus 40 because of the wide commercial availability. Furthermore, many variations of these retractors are currently on the market such that retractors of different shapes and sizes can be used and the seat tethering apparatus 40 of the present invention can thus be adapted to many different applications.

Figure 9:
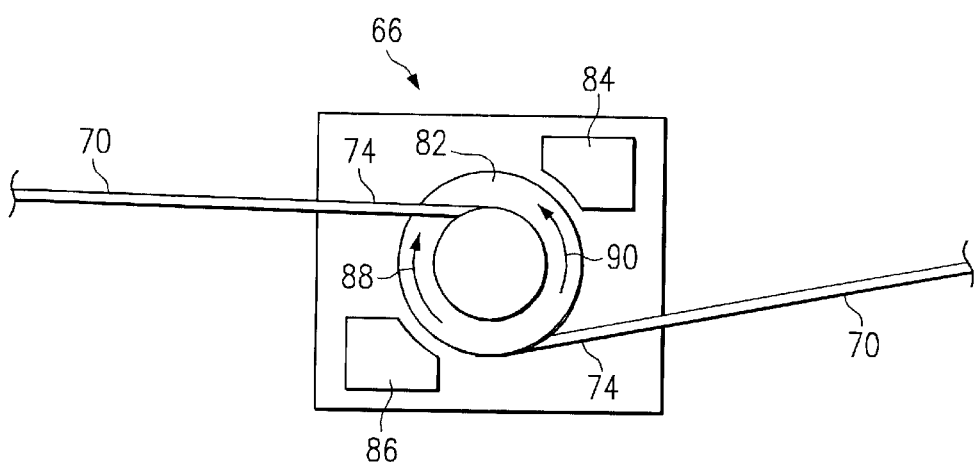
FIG. 9 is an enlarged front view of the retractor mechanism of FIGS. 3–5 and 8.

A retractor 66 of the type generally used for vehicle seat belts includes a spool assembly 82, a locking mechanism 84, and a biasing mechanism 86. The second end 74 of the webbing member 70 is wrapped around the spool assembly 82. Referring to FIG. 9, it can be seen that the spool assembly 82 is mounted in the retractor 66 such that it may rotate in two different directions, a webbing retraction direction 88 and a webbing withdrawal direction 90. Rotating the spool assembly 82 in the webbing retraction direction 88 wraps an additional length of webbing member 70 around the spool assembly 82 and thereby decreases the free length 78. Conversely, rotating the spool assembly 82 in the webbing withdrawal direction 90 unwraps a certain length of the webbing member 70 from around the spool assembly 82 and thereby increases the free length 78.

Referring to FIG. 9, the locking mechanism 84 of the retractor 66 prevents the rotation of the spool assembly 82 when it is in a locked position. The importance of the locking mechanism 84 is that it prevents rotation in the webbing withdrawal direction 90 when in the locked position, thus preventing the free length 78 from increasing and thereby preventing the movement of the seat 20 relative to the floor 28 during a period of acceleration and/or impact. Whether or not the locking mechanism 84 locks the rotation of the spool assembly 82 in the webbing retraction direction 88 in addition to the webbing withdrawal direction 90 does not significantly affect the operation of the seat tethering apparatus 40. Even if the locking mechanism 84 does lock in the webbing retraction direction 88, it is extremely unlikely that any force in the webbing retraction direction would overcome the force applied in the webbing withdrawal direction 90 during a collision or other high acceleration and/or impact situation that causes the locking mechanism to lock.

The biasing mechanism 86 of the retractor 66 applies a constant predetermined force to the spool assembly 82 that urges the spool assembly to rotate in the webbing retraction direction 88. When the locking mechanism 84 is not in the locked position, the force applied by the biasing mechanism 86 constantly urges the free length 78 to decrease. The rotation of the spool assembly 82 is dependent on whether the counteracting force applied to the webbing member 70 is greater than, equal to, or less than predetermined force applied by the biasing mechanism 86. In other words, the rotation of the spool assembly 82 depends on whether the seat 20 is being adjusted or not.

If the seat frame 22 is adjusted to a position closer to the floor 28, then the force applied by the biasing mechanism 86 will be greater than a counteracting force applied to the webbing member 70 by movement of the seat frame 22, thus causing rotation of the spool assembly 82 in the webbing retraction direction 88 and decreasing the free length 78. Conversely, if the seat frame 22 is adjusted to a position further away from the floor 28, then the force applied by the biasing mechanism 86 will be less than a counteracting force applied to the webbing member 70 by movement of the seat frame 22, thus causing rotation of the spool assembly 82 in the webbing withdrawal direction 70 and an increase in the free length 78. Of course, if the locking mechanism 84 is in the locked position, then the counteracting force applied to the webbing member 70 by the attempted movement of the seat frame 22 will be inhibited by the locking mechanism 84, thus preventing any increase in the free length 78 and restricting any relative motion between the seat frame 22 and the floor 28. Essentially, the constant force applied by the biasing mechanism 86 in the webbing retraction direction 88 takes up any slack in the webbing member 70 such that the free length 78 is always taut between the floor 28 and the retractor 66 (and thereby taut between the floor 28 and the seat frame 22). In this manner, the free length 78 is automatically adjusted by the biasing mechanism 86 without any need for manual adjustment by an individual.

The mounted position of the sensing mechanism 68 is not particularly critical to the present invention; provided however, the sensing mechanism 68 should be mounted so as to experience the accelerations experienced by the floor 28 while also maintaining a communication link 92 with the locking mechanism 84 of the retractor 66. As illustrated in FIG. 2, one location for the sensing mechanism 68 is to attach it directly to the floor 28, but it can also be mounted to the seat frame 22 with the retractor 66, to a dashboard inside the vehicle, or in many other locations in and around the vehicle. At any given time, the sensing mechanism 68 can sense whether the floor 28 is experiencing a specified range of normal accelerations (retractor operation characteristic) or an acceleration in excess of that specified range (vehicle collision characteristic). The sensing mechanism 68 produces a signal indicative of that characteristic and communicates that signal to the locking mechanism 84 of the retractor 66. The locking mechanism 84 then responds to the signal communicated from the sensing mechanism 68 by (i) locking the spool assembly 82 if a vehicle collision characteristic signal is received or (ii) maintaining an unlocked spool assembly 82 if a retractor operation characteristic signal is received.

The sensing mechanism 68 can be any type of sensor commonly known in the art that can sense acceleration. For example, the following types of sensors are particularly well suited to be used as the sensing mechanism 68: centrifugal sensors, pendulum sensors, inertia sensors, multi-axis sensors, impact sensors, electronic sensors, accelerometer sensors, and the like. The scope of the present invention is not limited to the type of sensor used for the sensing mechanism 68, but rather encompasses any commonly known sensor that can sense acceleration and can facilitate issuance of a signal on the communication link 92 to the locking mechanism 84 of the retractor 66.

The advantage of the seat tethering apparatus 40 is a system that provides added support to the vehicle seat 20 to limit motion of the seat 20 relative to the vehicle floor 28 during periods of excessive acceleration such that may occur in impact/collision scenarios. In particular, the free length 78 in the present invention is automatically adjusted to remove any slack that occurs as a result of adjusting the vehicle the seat 20, whether the seat is adjusted manually by an individual or adjusted automatically by the weight of the individual seated on it. By automatically removing the slack in the webbing member 70, the present invention restricts the amount of secondary accelerations and impact effects passed to an individual belted to the seat 20 when the vehicle experiences periods of extreme acceleration, as during collisions and rollovers. Based on the relationship between the number of accelerations to which the individual is subjected and the extent of injuries experienced, the present invention may help to reduce the risk of serious or fatal injuries as compared to those experienced when the prior seat tethers are used.

Another embodiment of the present invention incorporates a retractor driving mechanism 90 in communication with the sensing mechanism 68 and the retractor 66. As does the locking mechanism 84, the retractor driving mechanism 90 activates in response to a vehicle collision characteristic signal sent by the sensing mechanism 68. When activated, the retractor driving mechanism 90 actively drives the retractor 66 by rotating the spool assembly 82 in the webbing retraction direction 88. As a result, if a retractor driving mechanism 90 is incorporated into the present invention, then the locking mechanism 84 should only lock the spool assembly 82 from rotating in the webbing withdrawal direction 90 such that the retractor driving mechanism 90 can still drive the spool assembly 82 to rotate in the webbing retraction direction 88. The retractor driving mechanism 90 can be any mechanism that can actively force rotation of the spool assembly 82 of the retractor 66. Some examples of acceptable retractor driving mechanisms 90 include a gas generator and piston, a pneumatic piston, an air motor, an electric motor, and the like. However, many other possible retractor driving mechanisms 90 will be apparent to those skilled in the art.

Other variations on the present invention can also be used to improve the performance of the seat tethering apparatus 40. For example, one variation of the apparatus is to use more than one the seat tethering apparatus 40 for a single vehicle seat 20. In other words, additional support during a period of excessive acceleration may be provided by using two or more retractors 66, two or more sensing mechanisms 68, and two or more webbing members 70. If the two or more retractors 66 are attached to the seat 20 at different points, then support may be provided in multiple directions at the same time during a collision or other high acceleration event. Accordingly, the amount of movement of the seat 20 relative to the floor 28 can be restricted even more if multiple seat tethering apparatus according to the present invention are used on a single seat 20.

Figure 3:
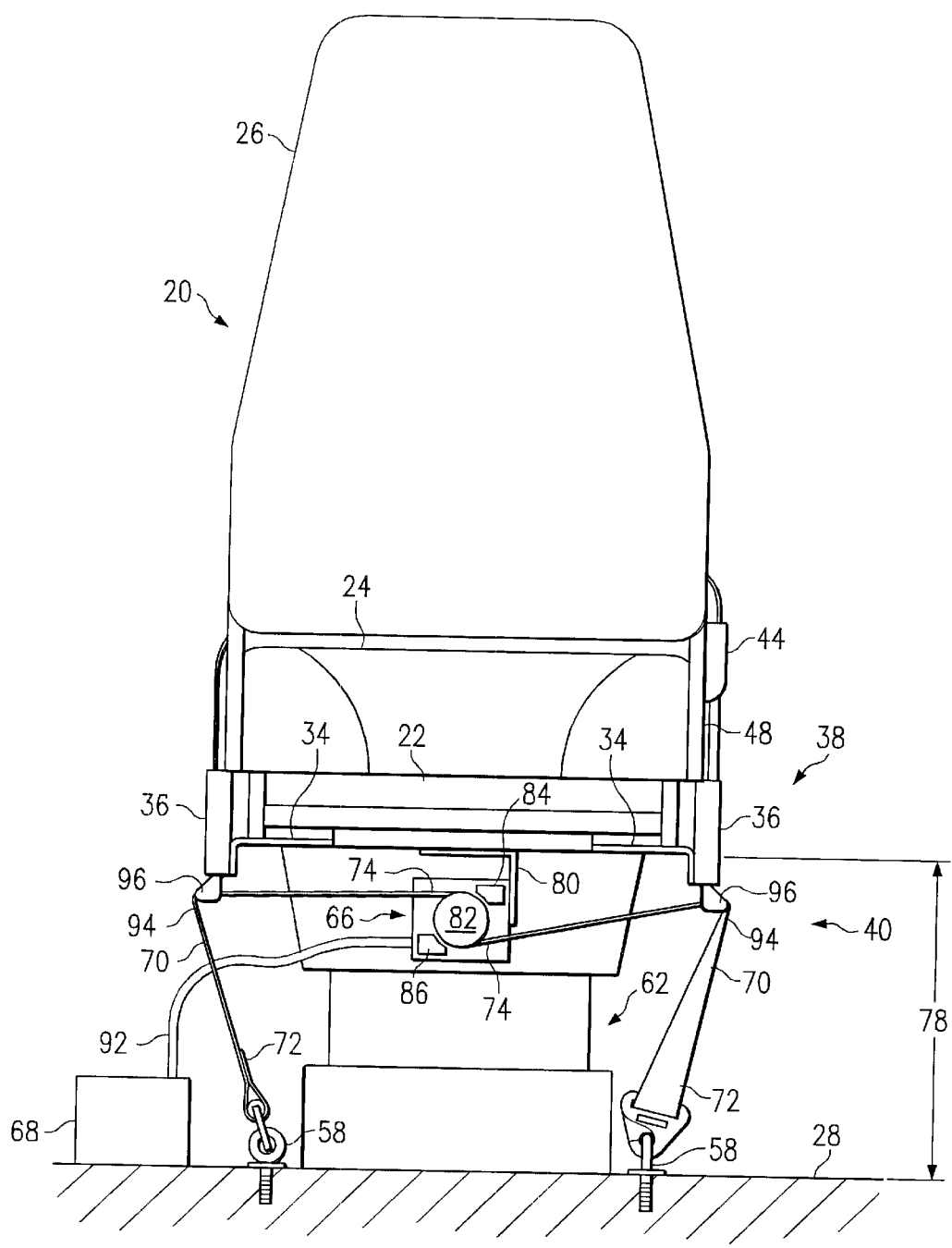
FIG. 3 is a back view of a pedestal mounted vehicle seat having a tethering apparatus according to a second embodiment of the present invention.
Figure 4:
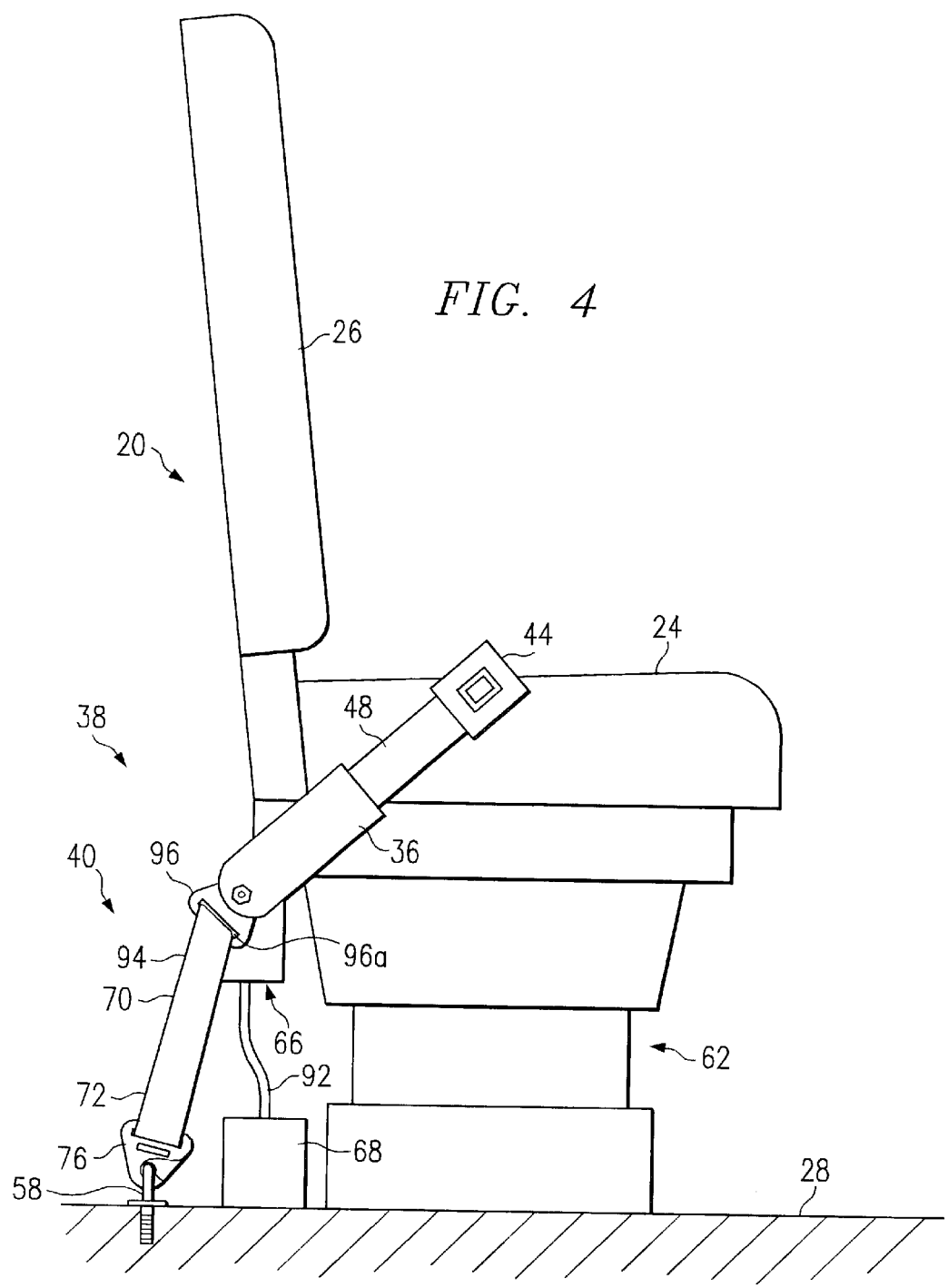
FIG. 4 is a side view of the seat and tethering apparatus of FIG. 3.

Although additional support can be provided to the seat 20 by using multiple seat tethering apparatus 40, it may be more efficient and economical to use multiple webbing members 70 with a single retractor 66 and a single sensing mechanism 68, as shown in FIGS. 3 and 4. It can be seen in FIG. 3 that the seat 20 is identical to that described in FIG. 2, but the adjustable suspension mechanism 62 varies. However, this difference in the suspension mechanism 62 does not change the use of the seat tethering apparatus 40. As with the embodiment shown in FIG. 2, the embodiment shown in FIGS. 3 and 4 utilizes a single retractor 66 and a single sensing mechanism 68 with a communication link 92. However, the preferred embodiment utilizes two webbing members 70 instead of a single webbing member 70, each webbing member has a first end 72, a second end 74, and an intermediate portion 94. Furthermore, two guide portions 96 are rigidly attached to the ICPs 36, respectively. Each webbing member 70 is threaded through a corresponding guide portion 96 such that the intermediate portion 94 of each the webbing member 70 is supported by a corresponding guide portion 96. As can be seen in FIG. 4, the guide portions 96 have an aperture 96a through which the webbing members 70 can pass, wherein the webbing members 70 can slide in both directions so that any slack in the webbing members 70 is removed by operation of the retractor 66. In this preferred embodiment, the retractor 66 operates identically as described for the first embodiment illustrated in FIG. 2. The guide portions 96 can take the form of any apparatus that will redirect the webbing members 70 while still allowing the webbing members 70 to freely slide.

As shown in FIG. 3, the first end 72 of each webbing member 70 is attached to the floor 28. Preferably, the first ends 72 are attached at locations on the floor 28 separate from each other such that additional support is provided by restricting the relative motion of the seat 20 from multiple points of support. As with the embodiment illustrated in FIG. 2, the first ends 72 of the webbing members 70 can be attached to the floor 28 by any means that maintains a secure connection, e.g., two anchors 76. The second ends 74 of the webbing members 70 are both wrapped around the spool assembly 82 of the retractor 66 in the same direction such that rotation of the spool assembly 82 in the webbing retraction direction 88 retracts both the webbing members 70, and the rotation of the spool assembly 82 in the webbing withdrawal direction 90 increases the available operative length of the webbing members 70. The guide portions 96 are necessary to redirect the webbing members 70 such that they may be attached to the floor 28 at separate locations and both may still be properly wrapped around the spool assembly 82 of the retractor 66. Taken together, FIGS. 3 and 4 best illustrate that the webbing members 70 are redirected by the guide portions 96 such that a downward force(s) can be applied to the seat 20 at separate points during periods of excessive acceleration. This application of force at separate points of the seat 20 better restricts the movement of the seat 20 relative to the floor 28. It can be further appreciated that the present invention is not limited to a seat tethering apparatus 40 with only two webbing members 70 and guide portions 96 but can incorporate additional webbing members 70 and guide portions 96 to provide additional points of support to the vehicle seat 20. Each additional point of support provides an additional direction in which relative movement between the vehicle the seat 20 and the floor 28 is restricted.

Figure 5:
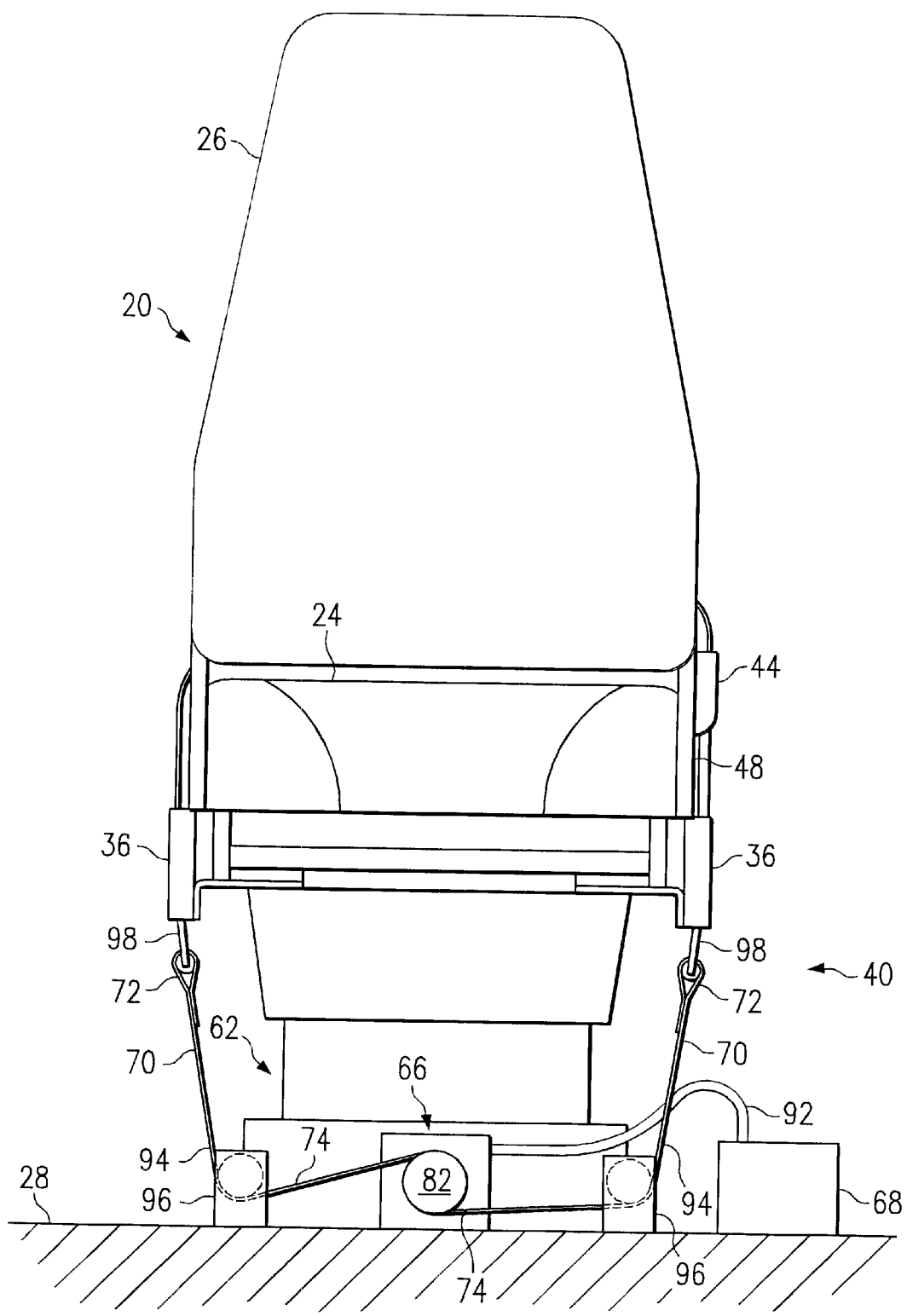
FIG. 5 is a back view of a pedestal mounted vehicle seat having a tethering apparatus according to a third embodiment of the present invention.

Still another embodiment of the present invention is illustrated in FIG. 5. Rather than attaching the retractor 66 to the seat 20 as with the embodiments shown in FIGS. 2–4, this third embodiment attaches the retractor 66 directly to the floor 28. Furthermore, unlike the embodiment shown in FIGS. 3 and 4 wherein the guide portions 96 are attached to the ICPs 36, the guide portions 96 in this third embodiment are attached directly to the floor 28. While the second ends 74 of the webbing members 70 are still wrapped around the spool assembly 82 of the retractor 66 and the intermediate portions 94 are threaded through the guide portions 96, the first ends 72 of the webbing members 70 are secured directly to the ICPs 36. As with the other embodiments, wherein the first ends 72 could be attached to the floor 28 in any manner appropriate, the first ends 72 of the webbing members 70 in this embodiment can also be attached to the ICP 36 in any appropriate manner. For example, the first ends 72 are shown to be secured to the loops 98 that are rigidly attached to the ICP 36, respectively.

It can be further appreciated that a similar configuration, wherein the retractor 66 is rigidly attached to the floor 28 instead of the seat 20, can also be applied in embodiments including only one the webbing member 70, including the configuration having more than two webbing members 70 and more than two guide portions 96 as well as more than one retractor 66 with more than one webbing member 70.

As is apparent from the depiction of the seat tethering apparatus 40 of the present invention being used with different adjustable suspension mechanisms 62 in FIGS. 2 and 3, the seat tethering apparatus 40 can be easily adapted to different seat and suspension mechanism configurations. If the configuration of the seat 20 and suspension mechanism 62 is such that there is not enough space directly underneath (or close to directly underneath) the seat 20, additional guide portions can be utilized to redirect webbing members from the desired point of support on the seat 20 to the retractor 60. This adaptability also provides the advantage that the seat tethering apparatus 40 of the present invention can be installed to existing vehicle seat and suspension mechanism configurations with little difficulty. As such, it should be appreciated that the scope of the present invention is not limited to only those vehicle seat and suspension mechanism configurations depicted in FIGS. 2–5.

Figure 6:
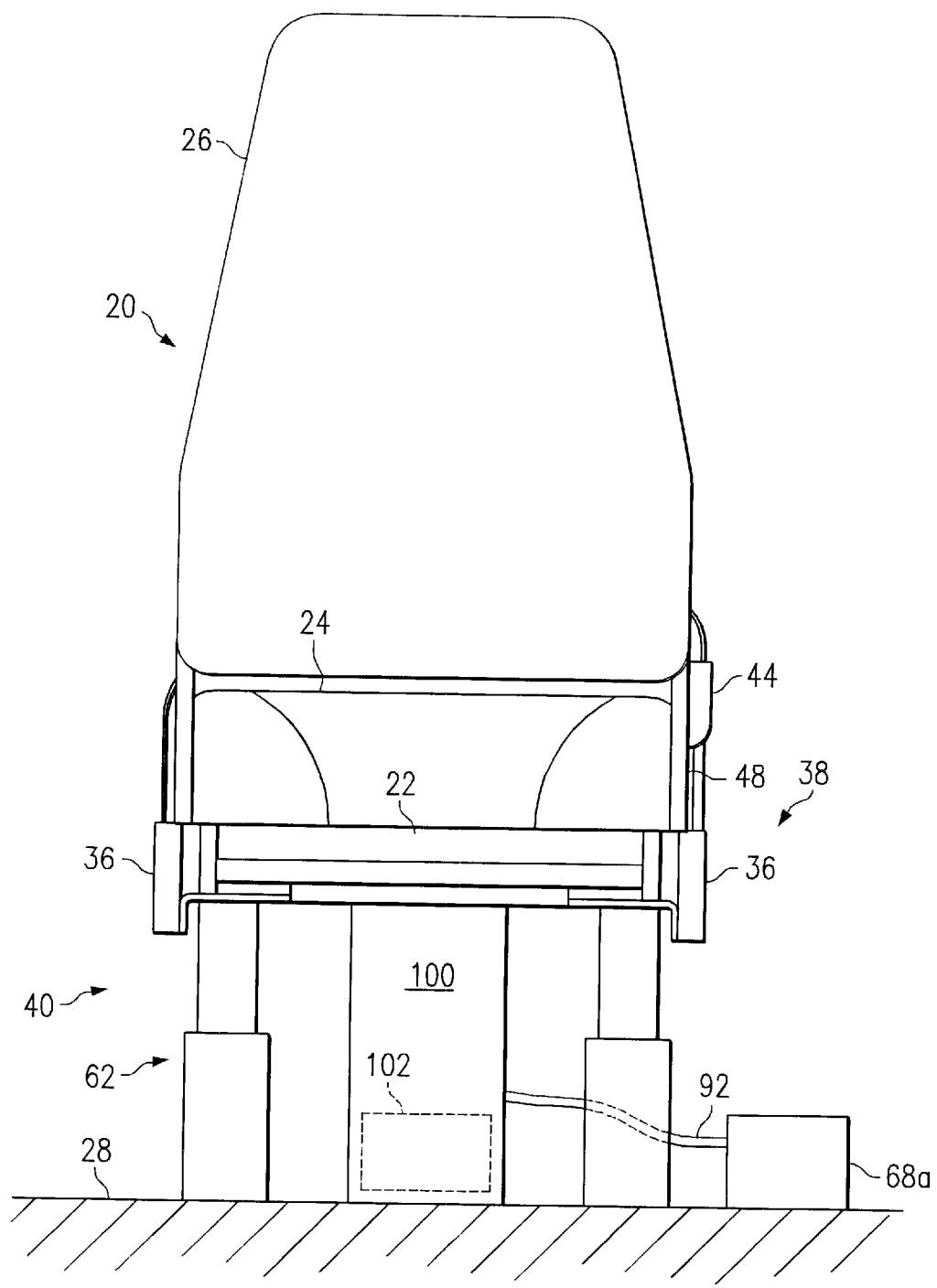
FIG. 6 is a back view of a pedestal mounted vehicle seat having a tethering apparatus according to a fourth embodiment of the present invention.
Figure 7:
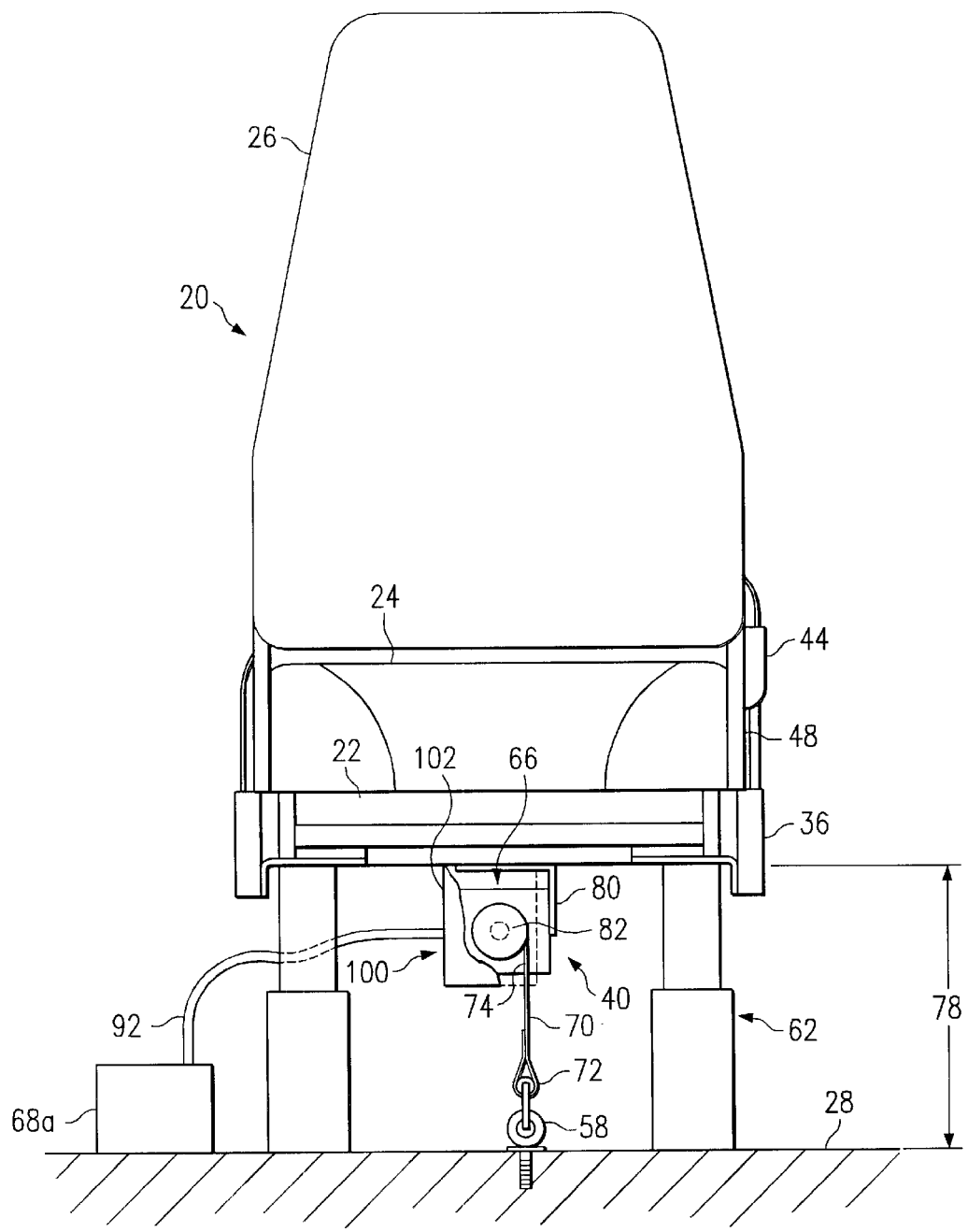
FIG. 7 is a back view of a pedestal mounted vehicle seat having a tethering apparatus with an active retractor according to a fifth embodiment of the present invention.
Figure 8:
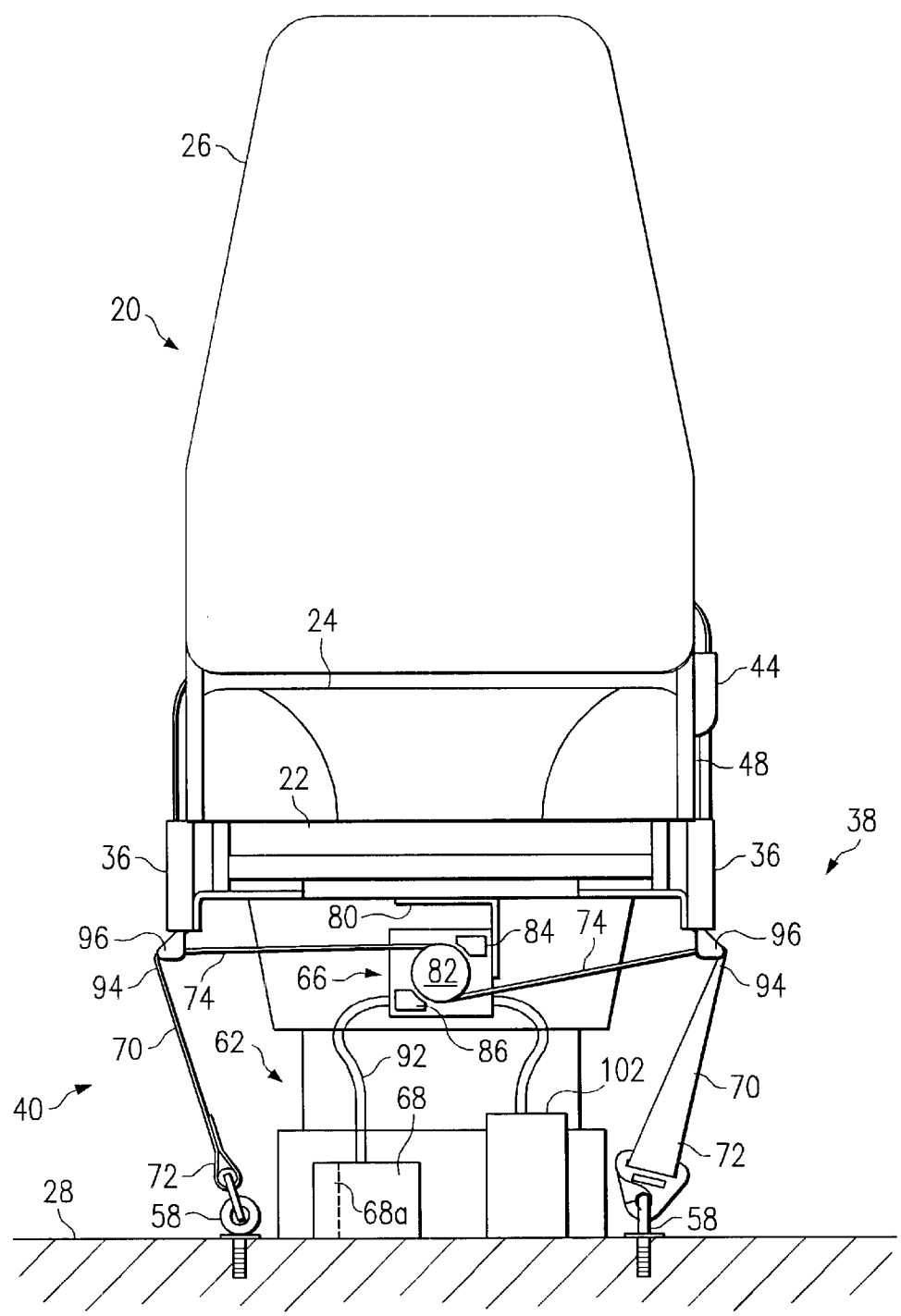
FIG. 8 is a back view of a pedestal mounted vehicle seat having a tethering apparatus with an active retractor according a sixth embodiment of the present invention.

Other embodiments of the seat tethering apparatus of the present invention is shown in FIGS. 6–8, wherein provision is made to actively retract seat 120 when a rollover of the vehicle begins to occur. When a vehicle rolls over onto its roof, many of the fatal injuries to passengers in the vehicle occur as a result of the collapse of the roof onto the heads and upper bodies of the passengers. As a result, if the space between the roof of the vehicle and the heads and upper bodies of the passengers can be maintained or even increased, then the probability of contact injuries should be reduced. Accordingly, when a rollover occurs, it is desirable to automatically retract seat 20 toward the floor 28 such that the head and upper body of the individual seated in seat 20 is as far away as possible from the roof of the vehicle (not shown).

The active retracting embodiment of the present invention includes a seat 20, a sensor mechanism 68a, a retractor mechanism 100, and a retractor driving mechanism 102, as illustrated in FIGS. 6 and 7. As with the embodiments already described, the sensor mechanism 68a can be mounted in a variety of positions as long as it experiences the same relative motion experienced by the floor 28 and remains in communication with the retractor driving mechanism 102 through a communication link 92. As shown in FIG. 6, one preferred location for the sensor mechanism 68a is to attach it directly to the floor 28, but it can also be mounted to the seat 20 along with the retractor mechanism 100, to a dashboard inside a vehicle, or in many other locations in and around the vehicle. At any given time, the sensor mechanism 68a can sense whether the floor 28 (i.e., the vehicle) is subject to normal vehicle operations (a normal operation characteristic) or is experiencing a rollover of the vehicle (a vehicle rollover characteristic). In response to the characteristic sensed by the sensor mechanism 68a, the sensor mechanism 68a produces a signal indicative of that characteristic and communicates that signal to the retractor mechanism 100. The retractor mechanism 100 then responds to the signal communicated from the sensor mechanism 68a by actively retracting the seat 20 if the vehicle rollover characteristic signal is received or remaining passive if the normal operation characteristic signal is received.

Similar to the sensing mechanism 68, sensor mechanism 68a can be any type of sensor generally known in the art that can sense a rollover. Sensing a rollover can involve sensing whether acceleration to one side or the other has exceeded a specified threshold, or it can involve sensing whether the angle of the vehicle has exceeded a specified threshold. As with the sensing mechanism 68, the following types of sensors are particularly well suited to be used as sensor mechanism 68a: centrifugal sensors, pendulum sensors, inertia sensors, multi-axis sensors, impact sensors, electronic sensors, accelerometer sensors, and the like. The scope of the present invention is not limited by the type of sensor used for sensor mechanism 68a, but rather encompasses any generally known sensor that can sense a rollover and can facilitate issuance of a signal on the communication link 92. To function in cooperation with retractor mechanism 100, the retractor driving mechanism 102 can be any type of device that can actively retract the seat 20 toward the floor 28. Examples of acceptable retractor driving mechanisms 102 are a gas generator and piston, a pneumatic piston, an air motor, an electric motor, and the like. Other possibilities for driving the retractor mechanism 100 and the sensor mechanism 68a will become apparent to those skilled in the art.

In the embodiment illustrated in FIG. 7, it can be seen that the seat tethering apparatus 62 for actively retracting the seat 20 can include a retractor 66, a webbing member 70, a sensor mechanism 68, and a retractor driving mechanism 102 in a configuration similar to that already described with respect to FIGS. 2–4. The webbing member 70 has a first end 72 securely attached to the floor 28, wherein the first end 72 can be secured by use of an anchor 58 or any other means by which a connection between the floor 28 and the first end 72 is securely maintained. The webbing member 70 also has a second end 74 attached to the retractor 66. A free length 78 extends between the floor 28 and the frame 22. In particular, the retractor 66 includes a spool assembly 82, around which the second end 74 of the webbing member 70 is wound. The spool assembly 82 is freely rotatable in both a webbing retraction direction 88 and a webbing withdrawal direction 90, whereas driving the retractor 66 can cause the free length 78 may be desirably decreased or increased, respectively. The retractor driving mechanism 102 provides a driving force to rotate the spool assembly 82 in the webbing retraction direction 88 only when the sensor mechanism 68 communicates a vehicle rollover characteristic signal. At all other times, the spool assembly 82 is preferably freely rotatable in either direction.

As with the embodiments discussed above, variations of this preferred embodiment will become apparent to those skilled in the art. One particular preferred embodiment is depicted in FIG. 8 wherein multiple webbing members 70 are included, each webbing member 70 having respective first ends 72 attached to the floor 28 at different locations and having second ends 74 wrapped around the spool assembly 82 of the retractor 66. Furthermore, each webbing member 70 includes an intermediate portion 94 passing through a corresponding guide portion 96 which is attached to ICPs 36 on the seat 20. In this preferred embodiment, activation of the retractor driving mechanism 102 in response to a received vehicle rollover characteristic signal from the sensor mechanism 68a decreases the free length 78 by rotating the spool assembly 82 retraction direction 88, thereby pulling seat 20 closer to the floor 28.

Signals issued by the sensory mechanism 68 are in accord with that earlier described in the context of the embodiment illustrated in FIG. 3.

It will be readily apparent that the seat tethering apparatus of the present invention can also be used in other settings, for example in vans, locomotives, and any other vehicles wherein it is desirable to limit the movement of a seat relative to a vehicle floor or frame.

It is to be understood that even though the above numerous characteristics and advantages of the invention have been set forth in the foregoing description, together with details of the structure and function of the invention, the disclosure is illustrative only, and changes may be made in detail, especially in matters of shape, size and arrangement of parts within the principle of the invention to the full extent indicated by the broad general meaning of the terms in which the appended claims are expressed.

It is claimed:

1. An apparatus for tethering a seat to a vehicle, said apparatus comprising:

a retractor having a spool assembly, a locking mechanism, and a biasing mechanism;

a sensing mechanism, coupled to the retractor, to sense at least one operational characteristic of the vehicle and to output a signal representative of at least one sensed operational characteristic;

a first webbing member having a first anchoring end and a first spooling end, the first spooling end being secured to the spool assembly;

a second webbing member, having a second anchoring end and a second spooling end, the second spooling end being secured to the spool assembly, wherein the spool assembly is rotatably supported by the retractor so as to selectively (i) rotate in a first direction to wind the first and second webbing members about the spool assembly and retract the first and second webbing members within the retractor and (ii) rotate in a second direction to unwind any portion of the first and second webbing members wound about the spool assembly, wherein in response to prescribed signals output from the sensing mechanism, the locking mechanism is adapted to selectively prevent rotation of the spool assembly, and wherein when the spool assembly is in a freely rotatable state, the biasing mechanism is adapted to bias the spool assembly to rotate in the first direction with a predetermined force.

2. An apparatus in accordance with claim 1, wherein the at least one operational characteristic concerns a retractor operation characteristic.

3. An apparatus in accordance with claim 1, wherein the at least one operational characteristic concerns a vehicle collision characteristic.

4. An apparatus in accordance with claim 1, wherein the at least one operational characteristic concerns extreme vehicle instability, such instability relating to a rollover state of the vehicle.

5. An apparatus in accordance with claim 1, further comprising a guide member, adapted to be affixed to at least one of the vehicle and the seat, to receive and slidably support at least one of the first and second webbing members at a point intermediate to the respective anchoring and spooling ends.

6. An apparatus in accordance with claim 1, further comprising a retractor driving mechanism adapted to rotatably drive the retractor so as to rotate the spool assembly in the first direction in response to a predetermined sensed operational characteristic.

7. An apparatus for tethering a seat to a vehicle, said apparatus comprising:
   a retractor, adapted to be affixed to at least one of the vehicle and the seat, having a spool assembly, a locking mechanism, and a biasing mechanism;
   a sensing mechanism, coupled to the retractor, to sense at least one operational characteristic of the vehicle and to output a signal representative of at least one sensed operational characteristic;
   a webbing member, having a first end attachable to at least one of the vehicle and the seat and a second end secured to the spool assembly, to tether the seat to the vehicle; and
   a retractor driving mechanism adapted to rotatably drive the retractor so as to rotate the spool assembly in the first direction in response to a predetermined sensed operational characteristic,
   wherein the spool assembly is rotatably supported by the retractor so as to selectively (i) rotate in a first direction to wind the webbing member about the spool assembly and retract the webbing member within the retractor and (ii) rotate in a second direction to unwind any webbing member wound about the spool assembly,
   wherein in response to prescribed signals output from the sensing mechanism, the locking mechanism is adapted to selectively prevent rotation of the spool assembly,
   wherein when the spool assembly is in a freely rotatable state, the biasing mechanism is adapted to bias the spool assembly to rotate in the first direction with a predetermined force,
   wherein in reference to the seat being in an installed state, a ride height distance extends between a sitting surface of the seat and a surface of the vehicle to which the seat is mounted, and
   wherein the retractor driving mechanism is adapted to decrease the ride height distance in response to a predetermined signal output by the sensing mechanism.

8. An apparatus in accordance with claim 7, wherein the at least one operational characteristic concerns a retractor operation characteristic.

9. An apparatus in accordance with claim 7, wherein the at least one operational characteristic concerns a vehicle collision characteristic.

10. An apparatus in accordance with claim 7, wherein the at least one operational characteristic concerns extreme vehicle instability, such instability relating to a rollover state of the vehicle.

11. An apparatus in accordance with claim 7, further comprising a guide member, adapted to be affixed to at least one of the seat and the vehicle, to receive and slidably engage the webbing member at a point intermediate to the first end and the second end of the webbing member.

12. An apparatus to retract a vehicle seat, which is vertically movable, toward a vehicle floor to which the vehicle seat is mounted, said apparatus comprising:
   a sensor mechanism to sense at least one characteristic selected from a normal operation characteristic and a vehicle rollover characteristic and to output at least one signal corresponding to a sensed characteristic; and
   a retractor mechanism, operatively coupled between the sensor mechanism and the vehicle seat, to operate and retract the vehicle seat toward the vehicle floor in response to a received signal from the sensor mechanism that corresponds to a sensed vehicle rollover,
   wherein the retractor mechanism includes:
      a spool assembly;
      a first webbing member extending from the spool assembly in a first direction towards an anchoring end of the first webbing member; and
      a second webbing member extending from the spool assembly in a second direction toward an anchoring end of the second webbing member,
   wherein the spool assembly is rotatably mounted to one of the vehicle seat and the vehicle floor, and the anchoring end of each of the first and second webbing members is mounted to the other one of the vehicle seat and the vehicle floor.

13. A system to retract a vehicle seat toward a vehicle floor on which such vehicle seat is mounted, the system comprising:
   a vehicle seat having a base that is mountable to a vehicle floor;
   a sensor mechanism to sense a vehicle event and to output a signal indicative of a detected vehicle event; and
   a retractor, coupled in part to the vehicle seat, to effect a retraction of the vehicle seat relative to the vehicle floor in response to an output signal from the sensor mechanism, the retractor including a spool assembly and a locking mechanism;
   a first webbing member having a first spooling end wound about the spool assembly in a first direction and extending from the spool assembly towards an anchoring end of the first webbing member; and
   a second webbing member having a second spooling end wound about the spool assembly in said first direction and extending from the spool assembly towards an anchoring end of the second webbing member,
   wherein the spool assembly is rotatably mounted to the retractor, and
   wherein the first and second webbing members are wound about the spool assembly such that they form alternating layers.

14. A system in accordance with claim 13, wherein the vehicle event is a vehicle rollover.

15. An apparatus for tethering a vehicle seat, said apparatus comprising:
   a retractor, adapted to be affixed to at least one of the vehicle and the seat, the retractor having a spool assembly, a locking mechanism, and a biasing mechanism;
   a sensing mechanism, coupled to the retractor, to sense at least one vehicle event and to output a signal representative of at least one sensed vehicle event; and
   a plurality of webbing members to tether the seat to the vehicle, each webbing member having a first end attachable to at least one of the seat and the vehicle and a second end secured to the spool assembly,
   wherein the spool assembly is rotatably supported by the retractor so as to selectively (i) rotate in a first direction to simultaneously wind each of the plurality of webbing members about the spool assembly and retract the webbing members within the retractor and (ii) rotate in a second direction to simultaneously unwind each of the plurality of webbing members wound about the spool assembly, wherein in response to prescribed signals output from the sensing mechanism, the locking mechanism is adapted to selectively prevent rotation of the spool assembly, and wherein when the spool assembly is in a freely rotatable state, the biasing mechanism is adapted to bias the spool assembly to rotate in the first direction with a predetermined force.

16. An apparatus in accordance with claim 15, further comprising a guide member for each webbing member, each guide member being adapted to be affixed to the seat, to respectively receive and slidably support a webbing member at a point intermediate to its first end and its second end.

17. An apparatus in accordance with claim 15, further comprising a retractor driving mechanism adapted to rotatably drive the retractor so as to rotate the spool assembly in the first direction in response to a sensed vehicle rollover.

18. An apparatus for tethering a vehicle seat, said apparatus comprising:

a retractor, adapted to be affixed to at least one of the vehicle and the seat, the retractor having a spool assembly, a locking mechanism, and a biasing mechanism;

a sensing mechanism, coupled to the retractor, to sense at least one vehicle event and to output a signal representative of at least one sensed vehicle event;

a plurality of webbing members to tether the seat to the vehicle, each webbing member having a first end attachable to at least one of the seat and the vehicle and a second end secured to the spool assembly; and a retractor driving mechanism adapted to rotatably drive the retractor so as to rotate the spool assembly in the first direction in response to a sensed vehicle rollover, wherein the spool assembly is rotatably supported by the retractor so as to selectively (i) rotate in a first direction to simultaneously wind each of the plurality of webbing members about the spool assembly and retract the webbing members within the retractor and (ii) rotate in a second direction to simultaneously unwind each of the plurality of webbing members wound about the spool assembly, wherein in response to prescribed signals output from the sensing mechanism, the locking mechanism is adapted to selectively prevent rotation of the spool assembly, wherein when the spool assembly is in a freely rotatable state, the biasing mechanism is adapted to bias the spool assembly to rotate in the first direction with a predetermined force, wherein in reference to the seat being in an installed state, a ride height distance would extend between approximately a sitting surface of the seat and a surface of the vehicle to which the seat is mounted, and wherein the retractor driving mechanism is adapted to decrease the ride height distance in response to a predetermined signal output by the sensing mechanism.

19. An apparatus for tethering a seat to a vehicle, said apparatus comprising:

a retractor, adapted to be affixed to the vehicle, having a spool assembly, a locking mechanism, and a biasing mechanism;

a sensing mechanism, coupled to the retractor, to sense at least one vehicle event and to output a signal representative of at least one sensed vehicle event; and a plurality of webbing members to tether the seat to the vehicle, each webbing member having a first end attachable to the seat and a second end secured to the spool assembly, wherein the spool assembly is rotatably supported by the retractor so as to selectively (i) rotate to wind the webbing members about the spool assembly and retract the webbing members within the retractor and (ii) rotate in a second direction to unwind any webbing members wound about the spool assembly, wherein in response to prescribed signals output from the sensing mechanism, the locking mechanism is adapted to selectively prevent rotation of the spool assembly, wherein when the spool assembly is in a freely rotatable state, the biasing mechanism is adapted to bias the spool assembly to rotate in the first direction with a predetermined force, wherein in reference to the seat being in an installed state, a ride height distance would extend between approximately a sitting surface of the seat and a surface of the vehicle to which the seat is mounted, and wherein the retractor driving mechanism is adapted to decrease the ride height distance in response to a predetermined signal output by the sensing mechanism.

20. An apparatus in accordance with claim 19, further comprising a guide member for each webbing member, each guide member being adapted to be affixed to the vehicle, to respectively receive and slidably engage a webbing member at a point intermediate to its first end and its second end.

21. A system to tether a vehicle seat to inhibit free vertical movement of the vehicle seat, wherein the vehicle seat includes a plurality of tether members, the system comprising:

a sensor mechanism to sense at least one acceleration-based vehicle characteristic and to output at least one signal corresponding to a sensed characteristic; and an arresting mechanism, coupled to the sensor mechanism so as to receive signals output from the sensor mechanism, to engage the tether members in response to receiving a prescribed signal output from the sensor mechanism, wherein when the tethering members are engaged the free vertical movement of the vehicle seat is impeded.

22. An operator's cab for a vehicle, the cab comprising:

an operator's compartment including an operator's seat mounted to a floor surface of the compartment, wherein the seat is freely movable in at least a vertical direction;

an engaging device, fixed to the seat, having a locking mechanism;

a sensing mechanism, coupled to the engaging device, to sense at least one operational characteristic of the vehicle and to output a signal representative of at least one sensed operational characteristic;

a first tether member, having a first anchoring end fixed to the vehicle and a first engaging end received by the engaging device, to tether the seat to the vehicle; and a second tether member, having a second anchoring end fixed to the vehicle and a second engaging end received by the engaging device, to further tether the seat to the vehicle, wherein in normal operations, the first and second tether members can extend and retract relative to the engaging device so as to avoid inhibiting free movement of the seat in at least the vertical direction, and wherein in response to a prescribed signal output from the sensing mechanism, the locking mechanism prevents the relative movement of the first and second tether members, thereby inhibiting the free movement of the seat.

23. An operator's cab for a vehicle, the cab comprising:

an operator's compartment including an operator's seat mounted to a floor surface of the compartment, wherein the seat is freely movable in at least a vertical direction;

an engaging device, fixed to the vehicle, having a locking mechanism;

a sensing mechanism, coupled to the engaging device, to sense at least one operational characteristic of the vehicle and to output a signal representative of at least one sensed operational characteristic;

a first tether member, having a first anchoring end fixed to the seat and a first engaging end received by the engaging device, to tether the seat to the vehicle; and a second tether member, having a second anchoring end fixed to the seat and a second engaging end received by the engaging device, to further tether the seat to the vehicle, wherein in normal operations, the first and second tether members can extend and retract relative to the engaging device so as to avoid inhibiting free movement of the seat in at least the vertical direction, and wherein in response to a prescribed signal output from the sensing mechanism, the locking mechanism prevents the relative movement of the first and second tether members, thereby inhibiting the free movement of the seat.

* * * * *

UNITED STATES PATENT AND TRADEMARK OFFICE
CERTIFICATE OF CORRECTION

PATENT NO.     : 6,481,777 B2
DATED          : November 19, 2002
INVENTOR(S)    : Garry J. Mans It is certified that error appears in the above-identified patent and that said Letters Patent is hereby corrected as shown below:

Title page,
Item [57], ABSTRACT,
Line 8, after "collision," delete "or an".
Line 8, delete "acceleration." and insert -- acceleration, and the like. --.

Column 16,
Line 9, after "rotate", insert -- in a first direction --.

Signed and Sealed this

Eleventh Day of March, 2003

JAMES E. ROGAN
*Director of the United States Patent and Trademark Office*